Nov. 14, 1950  N. J. SIMPKINS ET AL  2,530,086
STICK DISPENSER
Filed Aug. 9, 1949  2 Sheets-Sheet 1

INVENTORS
Nathaniel J. Simpkins
Donald H. Fischer
BY Victor J. Evans & Co.
ATTORNEYS Nov. 14, 1950   N. J. SIMPKINS ET AL   2,530,086
STICK DISPENSER
Filed Aug. 9, 1949   2 Sheets-Sheet 2
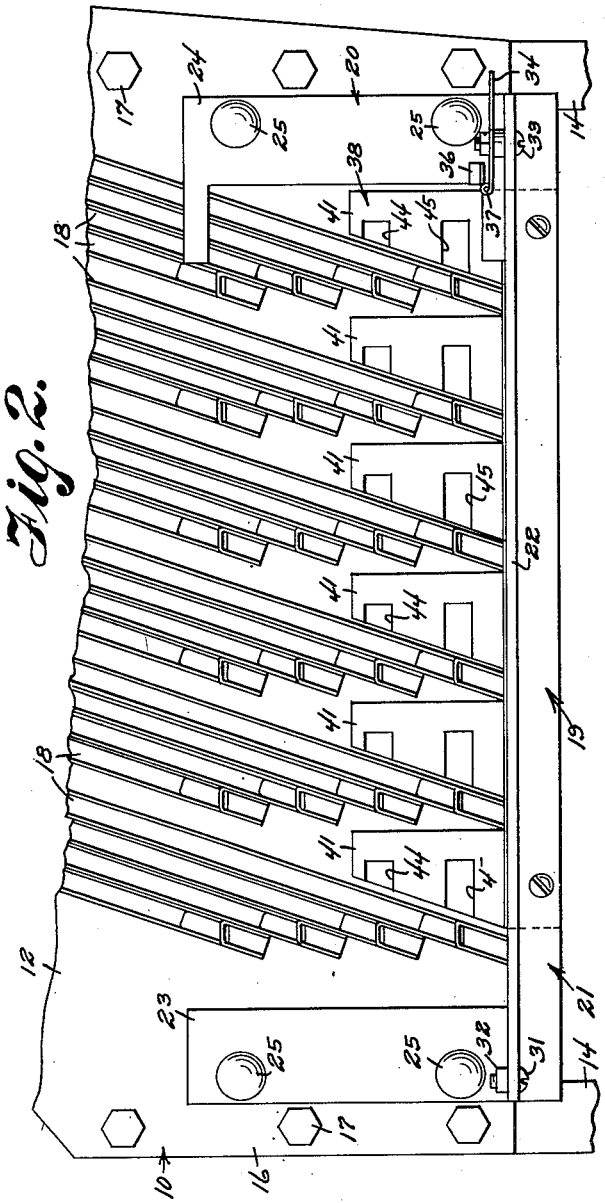
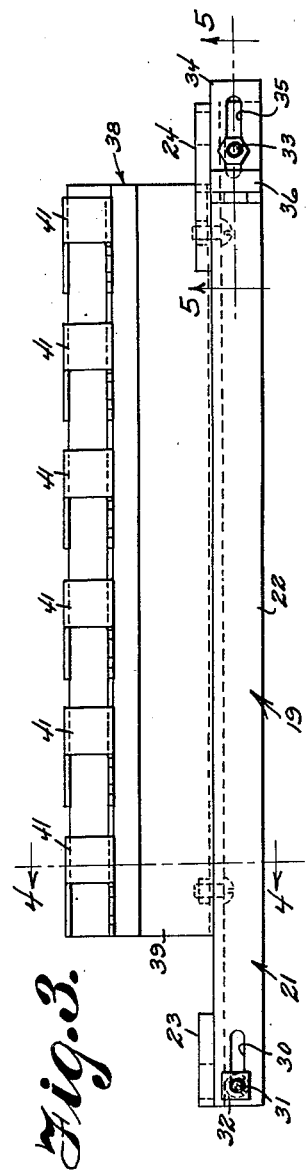
INVENTORS
Nathaniel J. Simpkins
Donald H. Fischer
BY Victor J. Evans & Co.
ATTORNEYS Patented Nov. 14, 1950

2,530,086

UNITED STATES PATENT OFFICE 2,530,086

STICK DISPENSER

Nathaniel J. Simpkins, Atlanta, and Donald H. Fischer, Decatur, Ga.

Application August 9, 1949, Serial No. 109,254

3 Claims. (Cl. 226—14)

This invention relates to a stick dispensing machine, and more particularly to a machine for loading stick holders that are used in manufacture of stick confections of the type wherein ice cream bars, or the like, are mounted on the ends of a pair of sticks.

The object of the invention is to provide an attachment for use on the stick dispensing machine shown in Patent Number 2,313,500; inventor, Ralph F. Anderson, so that by using the attachment of the present invention, Anderson's machine can be used for loading stick holders with sticks that are adapted to be used in making confections having twin sticks inserted therein.

Still another object of the invention is to provide an attachment whereby a stick dispensing machine of the type disclosed in the Anderson patent can be used for loading stick holders in such a manner that confections of the twin stick type can be molded.

A further object of the invention is to provide an attachment for a stick dispensing machine which is extremely simple and inexpensive to manufacture.

Other objects and advantages will be apparent during the course of the following description.

In the accompanying drawings, forming a part of this application, and in which like numerals are used to designate like parts throughout the same:

Figure 2 is a fragmentary front elevational view of the stick dispensing machine, showing the attachment of the present invention thereon;

Figure 3 is a top plan view of the attachment per se;

Figure 1:
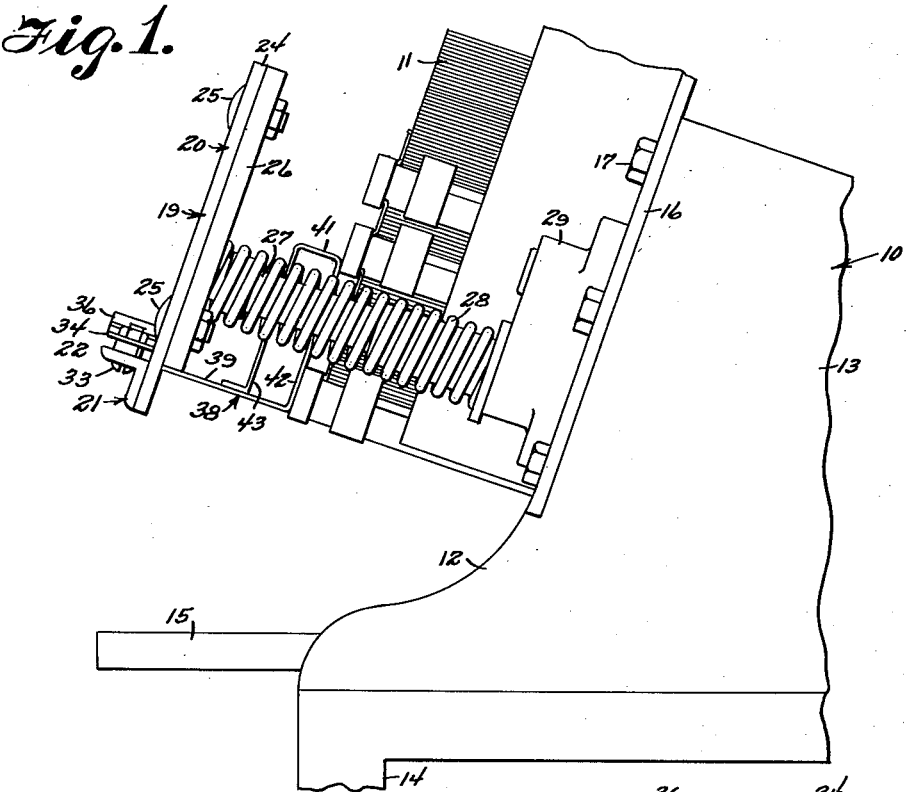
Figure 1 is a fragmentary side elevational view of a stick dispensing machine having the attachment of the present invention thereon.
Figure 4:
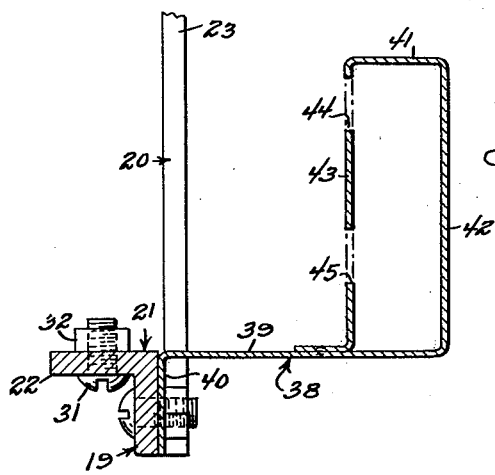
Figure 4 is an enlarged sectional view taken on the line 4—4 of Figure 3.

Referring to the drawings, there is shown a stick dispensing machine which is indicated generally by the numeral 10, and the dispensing machine 10 has the same construction and method of operation as the stick dispenser shown and described in Patent Number 2,313,500, inventor, R. F. Anderson. The dispensing machine 10 is of the type used for loading stick holders with sticks 11 that are used in manufacture of confections, such as ice cream bars. The Anderson patent discloses a machine for loading a stick holder with sticks whereby the sticks may be used in molding confections of the popsicle type. The present invention is directed to an attachment which is adapted to be used with the Anderson machine so that the stick holder can be loaded with sticks in such a manner that confections of the twin stick type can be manufactured.

The stick dispensing machine of the present invention includes a housing 12 which is provided with an end plate 13, Figure 1, and a plurality of legs 14 serve to support the housing 12. A tray 15 projects forwardly from the housing 12 for collecting any of the sticks 11 that may be accidentally discharged out of the housing 12. Further, the machine includes a face plate 16 that is secured to the housing 12 by bolt and nut assembly 17, Figures 1 and 2. Arranged on the front of the machine is a plurality of inclined magazines 18 which each support a plurality of super-imposed sticks 11 that are adapted to be ejected from the magazine 18 in the same manner as described in the Anderson patent mentioned above.

The present invention is directed to an attachment 19 which is operatively connected to the stick dispensing machine whereupon the sticks 11 are ejected from the magazine 18 when the attachment 19 is forced inwardly toward the housing 12.

The attachment 19 includes a body member 20 which has an angle iron 21 secured to the lower end thereof, as by welding. The angle iron 21 includes a portion 22 that acts as a flange to support thereon the stick holder when the stick holder is to be loaded with sticks.

The body member 20 includes a pair of legs 23 and 24 which are arranged in spaced parallel relation with respect to each other. A pad 26 is secured to the rear face of each of the legs 23 and 24 by a pair of bolt and nut assemblies 25. Extending between each of the pads 26 and the bearing member 29 is an actuating rod 27 which has a coil spring 28 circumposed thereon.

The flange portion 22 is provided with a slot 30 adjacent its left end and projecting through the slot 30 is a bolt 31 having a nut 32 arranged in threaded engagement therewith. The bolt and nut assembly 31 and 32 acts as a guide for insuring that the twin stick holder is correctly aligned prior to loading the holder with sticks.

A bolt and nut assembly 33 is arranged in engagement with the outer or right end of the flange portion 22 and the bolt and nut assembly 33 projects through an elongated slot 35 in a guide member 34. An ear 36 is hingedly connected to the guide member 34 by a pin 37. The member 34 also serves to insure that the stick holders are properly located or aligned with respect to the stick dispensing machine.

Arranged rearwardly of the body member 20 and connected thereto is a baffle 38. The baffle 38 includes a bottom section 39 that has a transverse portion 40 secured, by bolts and nuts, to the rear surface of the angle member 21. Further, the baffle 38 includes a plurality of spaced support members 41. Each of the support members 41 includes a back section 42 and a front section 43 which is arranged in spaced parallel relation with respect to the back section 42. The front section 43 is provided with a pair of spaced cut-outs 44 and 45 and the sticks 11 are selectively supported in the cut-outs 44 and 45 as later described in this specification.

In use, the attachment 19 of the present invention is connected to the stick dispensing machine shown in the Anderson patent, the rod 27 being connected to the pad 26. Then, the operator grasps the stick holder to be loaded and places the stick holder on the angle member 21. By pressing forwardly on the stick holder, the rods 27 are moved inwardly against the compression of the spring 28 and this movement of the rod causes the stick 11 to be ejected from the magazine 18 in the manner described in detail in the Anderson patent. Upon release of the pressure against the stick holder, the springs 28 cause the parts of the machine to return to the position shown in Figure 1 so that other stick holders can be successively loaded.

Figure 6:
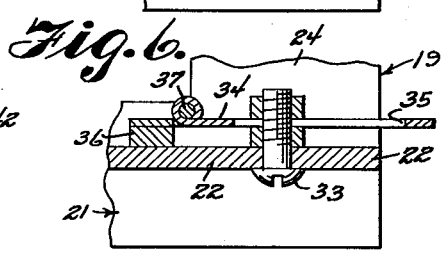
Figure 6 is a view similar to Figure 5, but showing the right guide member in the extended position.

When loading the stick holders with sticks that are to be used in molding confections, such as ice cream bars having only a single stick therein, the stick holder is first guided to the guide member 34 on the right end of the flange 22 and at this time the ear 36 is in the position shown in Figure 6. This insures that this holder is correctly aligned with the machine. Then, the stick holder is moved inwardly as previously described whereupon 24 of the sticks 11 are inserted into the stick holder.

Figure 5:
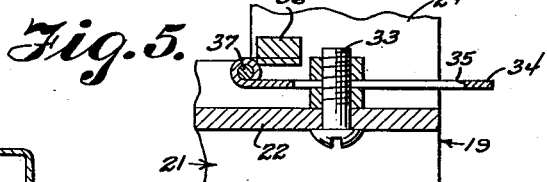
Figure 5 is an enlarged sectional view taken on the line 5—5 of Figure 3.

When the stick holder is to be loaded with sticks that are to be used in molding confections, such as popsicles having twin sticks therein, the stick holder is first guided to the bolt and nut assembly 31 and 32 on the left end of the flange 22. Then, the stick holder is moved inwardly towards the machine whereupon the first set of 24 sticks are inserted into the stick holder. These sticks are of course locked in the stick holder by means of the locking lever thereon. The stick holder is returned to normal position and the stick holder is then guided to a position contiguous to the guide member 34 on the right end of the flange 22, and at this time the ear 36 is in the position shown in Figure 5. This insures that the remaining unfilled holes in the stick holder are correctly aligned with the stick dispensing machine. As the stick holder is moved to this latter position on the right of the attachment 19, the sticks already in the stick holder now pass into the cut-outs 44 and 45. Then, the stick holder is again moved inwardly toward the machine whereupon 24 more sticks are ejected from the magazine 18 which strike the stick holder. The stick holder locking lever is then moved to unlock the stick holder and is then pushed in to complete the stroke and the 24 sticks of the second set are loaded into the stick holder. It is to be noted that the front section 43 of the baffle 48 provides a support for the sticks of the first set so that the sticks of the first set will not drop out of the stick holder while the second 24 sticks are being inserted in the holder. Finally, the locking lever of the stick holder is moved to locking position whereupon the stick holder is removed from the machine with the sticks arranged therein ready to be inserted in molds which are used in the manufacture of confections of the twin stick type.

What we claim:

1. An attachment for a stick dispensing machine comprising a body member, said body member including a pair of spaced parallel legs operatively connected to the machine, a flange projecting forwardly from said body member and secured thereto, adjustable guide means connected to said flange for insuring correct alignment of a stick holder on the attachment, a baffle arranged rearwardly of said body member and connected thereto, a plurality of support members projecting upwardly from said body member, each of said support members including a back section and a front section arranged in spaced parallel relation with respect to each other, there being a pair of cut-outs arranged in said front section for at times supporting therein sticks.

2. In a stick dispensing machine, the combination with a plurality of magazines having sticks therein adapted to be inserted in a stick holder, of an attachment for said machine whereby said holder can be loaded with sticks that are arranged in pairs whereby confections of the twin stick type can be loaded, said attachment comprising a body member operatively connected to said machine for causing ejection of the sticks from the magazine upon movement of said attachment toward said machine, a flange projecting forwardly from the lower portion of said body member for supporting the stick holder, guide means on said flange for assuring correct alignment of the stick holder with the machine, and a baffle arranged between said attachment and said machine and secured to said attachment, said baffle being provided with a plurality of support members for at times supporting sticks therein.

3. An attachment for a stick-dispensing machine comprising a body member, said body member including a pair of legs operatively connected to the machine, a flange projecting forwardly from said body member and secured thereto, adjustable guide means connected to said flange for insuring correct alignment of a stick holder on the attachment, a baffle connected to said body member, a plurality of support members projecting upwardly from said body member, each of said support members including a back section and a front section arranged in spaced parallel relation with respect to each other, there being a pair of cutouts arranged in said front section for at times supporting therein sticks.

NATHANIEL J. SIMPKINS.
DONALD H. FISCHER.

REFERENCES CITED

The following references are of record in the file of this patent:

UNITED STATES PATENTS

| Number | Name | Date |
|---|---|---|
| 1,929,340 | Wagner | Oct. 3, 1933 |